(12) United States Patent
Tong et al.

(10) Patent No.: US 7,523,816 B2
(45) Date of Patent: Apr. 28, 2009

(54) METHOD AND BRAKE ASSEMBLY RETENTION DEVICE WITH AUTOMATIC OPERATION

(75) Inventors: Lei Tong, South Bend, IN (US); Jon T. Beehler, Bremen, IN (US); Michael J. Zarembka, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 591 days.

(21) Appl. No.: 11/368,807

(22) Filed: Mar. 6, 2006

(65) Prior Publication Data
US 2007/0209884 A1 Sep. 13, 2007

(51) Int. Cl.
*F16D 55/36* (2006.01)
(52) U.S. Cl. .................. 188/73.32; 188/73.31
(58) Field of Classification Search ............. 188/71.1, 188/71.5, 72.3, 73.1, 73.31, 73.32
See application file for complete search history.

(56) References Cited

U.S. PATENT DOCUMENTS

| | | |
|---|---|---|
| 3,890,009 A | 6/1975 | Hummel |
| 3,958,833 A | 5/1976 | Stanton |
| 4,290,505 A | 9/1981 | Kramer |
| 4,860,865 A * | 8/1989 | Montalvo et al. ............. 192/70 |
| 5,402,865 A | 4/1995 | Harker |
| 5,437,352 A | 8/1995 | Harker |
| 5,485,898 A | 1/1996 | Patko |
| 5,494,138 A | 2/1996 | Scelsi et al. |
| 7,438,161 B2 * | 10/2008 | Burgoon et al. .......... 188/73.32 |

FOREIGN PATENT DOCUMENTS

| | | |
|---|---|---|
| EP | 0035327 A | 9/1981 |
| FR | 1334453 A | 8/1963 |
| GB | 1345174 A | 1/1974 |
| GB | 2100375 A | 12/1982 |

* cited by examiner

*Primary Examiner*—Christopher P Schwartz
(74) *Attorney, Agent, or Firm*—Birch, Stewart, Kolasch & Birch, LLP

(57) ABSTRACT

A method and a brake assembly retention device are disclosed. The method discloses the automatic operation of the brake assembly retention device to retain releasably the brake assembly upon a stationary member.

20 Claims, 9 Drawing Sheets

METHOD AND BRAKE ASSEMBLY RETENTION DEVICE WITH AUTOMATIC OPERATION

FIELD OF THE DISCLOSURE

This disclosure relates generally to a method and a brake assembly retention device with automatic operation and, more particularly, to an aircraft brake assembly retention device that operates automatically to retain releasably an aircraft brake assembly on a landing gear of an aircraft.

BACKGROUND

Typically, a military aircraft wheel and associated brake assembly are designed for a quick and easy removal from the axle upon which the wheel and the brake assembly are mounted. Initially, the brake assembly should remain on the axle while the wheel is being removed and, thus, prevent an accident if the brake assembly is permitted to slide off the axle with the wheel. Although the brake assembly can remain in an operational position for minor maintenance on the axle after removal of the wheel, typically the brake assembly is also designed for quick and easy removal from the axle.

FIG. 1 is a cross-sectional view of an example of a known aircraft brake assembly 10 and wheel 12. The wheel 12 is received upon a stationary member or axle 13 of an aircraft (not shown) by roller bearing assemblies 14 and 16. The axle 13 includes an axle flange 13A having axle flange openings 13B. An inner cone 15 of the bearing 14 abuts a bushing assembly 17 of a torque tube 20. An axle nut assembly 18 includes a washer 19, which abuts the roller bearing assembly 16. The torque tube 20 includes a plurality of splines 21, a plurality of bolted-on axial extensions 22 received in the axle flange openings 13B, and a torque tube foot 25 in which is located the bushing assembly 17. The bolted-on axial extensions 22 are received in the axle flange openings 13B to prevent rotation of the torque tube 20 relative to the axle 13. As is well known by those of ordinary skill in the art, the torque tube 20 is connected by a plurality of bolts (not shown) to a piston housing 30 of the brake assembly 10. The piston housing 30 includes a plurality of circumferentially spaced-apart piston assemblies 31. The brake assembly 10 further includes a set of stator discs 34 engaging the splines 21 of the torque tube 25, and a set of rotor discs 36 engaging drive keys (not shown) at the wheel 12.

As can be readily seen in FIG. 1, the axle nut assembly 18 retains the aircraft brake assembly 10 and the wheel 12 on the axle 13, by engaging the roller bearing assembly 16 that engages the wheel 12, the wheel 12 engaging the roller bearing assembly 14, the roller bearing assembly 14 engaging the bushing assembly 17 and the torque tube foot 25, which engage the axle flange 13A.

FIG. 2 is a cross-sectional view of a known manually-operated retention mechanism 40 of the brake assembly 10 in FIG. 1. The piston housing 30 (see FIG. 1) includes an outer boss 37 having a radial opening 33, and an inner boss 39 with an opening 38. The outer boss 37 has an outer radial surface 37A. The retention mechanism 40 includes a pin assembly 41 having an enlarged head 42 extending into a shaft 43 having an end part 50 that includes a flange 52. A spring 60 is located about the shaft 43 and trapped between the outer boss 37 and the flange 52 of the end part 50. End part 50 of the pin assembly 41 abuts the flange 13A of the axle 13, whereby the axle flange 13A is trapped axially between the end part 50 and the torque tube foot 25. The retention mechanism 40 requires manual operation so that the aircraft brake assembly 10 (see FIG. 1) may be either mounted upon or removed from the axle 13 of the aircraft. To retract the retention mechanism 40, the enlarged head 42 of the pin assembly 41 must be grasped and pulled radially outwardly in the direction of arrow 62 in FIG. 2, and then rotated so that the enlarged head 42 will engage the outer radial surface 37A when released (illustrated in phantom in FIG. 2). Then, the aircraft brake assembly 10 may be either placed upon the axle 13 or, if already on the axle, removed from axle. If being placed upon the axle 13, the brake assembly 10 will be moved axially along the axle 13 until the torque tube foot 25 abuts the axle flange 13A. The enlarged head 42 is then grasped manually, rotated to the position illustrated in solid line in FIG. 2, and released so that the end part 50 engages the axle flange 13A to couple the brake assembly 10 to the axle 13. Because the retention mechanism 40 is located on the inboard side of the aircraft brake assembly 10, in some circumstances maintenance personnel must be able to locate and operate the retention mechanism 40 without being able to see the retention mechanism.

FIG. 3 is a perspective view of another known aircraft wheel 112 and brake assembly 110 having a manually-operated retention mechanism 140 on the aircraft brake assembly 110. The retention mechanism 140 is illustrated in greater detail in FIGS. 3A and 4. The brake assembly 110 is mounted on an axle 113 of an aircraft landing gear 116. A piston housing 130 of the brake assembly 110 includes a torque take-out extension 133 having a pocket 135 that receives an axle extension 114 of the axle 113. Axle extension 114 includes an extension surface 115. The retention mechanism 140 is mounted, by bolts 141, to the torque take-out extension 133. As can be seen in FIGS. 3A and 4, the retention mechanism 140 includes a pin member 142 received in a lateral opening 152 of a retention bracket 150. A spring 160 is positioned on the pin member 142, and a spring end 164 abuts an outer surface 155 of the retention bracket 150. The pin member 142 has a lever 143, a washer 144 attached to the pin member 142 by a cotter pin 145 and engaging an end 162 of the spring 160, a roll pin 147 located within a portion of the lateral opening 152 of the retention member 150, and a pin member end 148 positioned near a side 157 of the retention bracket 150. The lateral opening 152 of the bracket 150 is a U-shaped through-opening having branches 153 and 154 which may receive the roll pin 147 when the pin member 142 is rotated. As illustrated in FIG. 3A, when the brake assembly 110 is in an operational position on axle 113, the pin member 142 extends through the retention bracket 150 so that the spring 160 is compressed. The roll pin 147 is received in the branch 154 of the opening 152 (not viewable in FIG. 3A). In this position, the pin member end 148 abuts the extension surface 115 of the axle extension 114, thereby retaining the brake assembly 110 on the axle 113. When the brake assembly 110 is to be removed from the axle 113, maintenance personnel must reach around the end of the brake assembly 110, grasp the lever 143 and rotate the pin member 142 so that the roll pin 147 exits the branch 154 whereby the force of the spring 160 causes the pin member 142 to move laterally through the lateral opening 152 until the roll pin 147 abuts an end of the lateral opening 152 adjacent branch 153 (see FIG. 4).

As shown in FIG. 3, the retention mechanism 140 is located on the inboard side of the aircraft brake assembly 110 and, thus, maintenance personnel must be able to locate and operate, without being able to see, the retention mechanism 140. Both lateral and rotational movements of the lever 143 must be accomplished by personnel so that the brake assembly 110 can be either mounted upon or removed from the axle 113. Thus, the operation of the pin assembly 140 is not intuitive to personnel who cannot see the pin assembly. When a maintenance person grasps the pin member 142, his clothing may be snagged or damaged by the cotter pin 145. Additionally, while the brake assembly 110 is mounted upon axle 113, it is possible for the pin member 142 to be hit or damaged by foreign objects and moved to a released position whereby the pin member end 148 no longer abuts the extension surface 115 of the axle extension 114. If the retention mechanism 140 is in the released position when the wheel 112 is removed from the axle 113, the brake assembly 110 can move with the wheel 112 and accidentally come off of the axle 113.

DETAILED DESCRIPTION

In general, the example method and brake assembly retention device may be utilized with various types of brake assemblies that are retained on various types of brake support members. Additionally, while the examples described herein are described in connection with aircraft applications in the aerospace industry, the examples described herein may be more generally applicable to a variety of braking applications in different industries.

Figure 5:
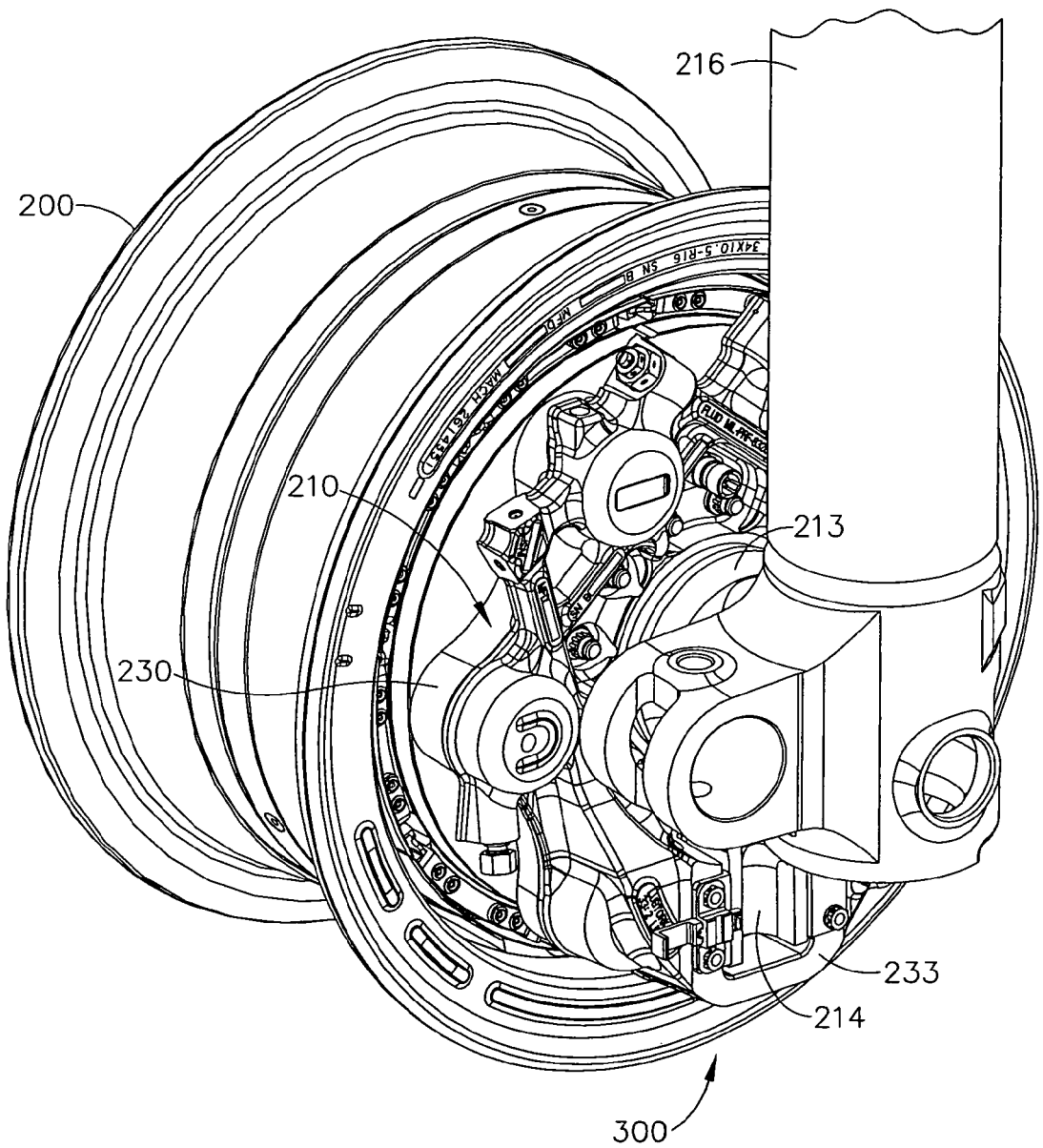
FIG. 5 is a perspective view of an aircraft wheel and brake assembly mounted on the axle of a landing gear and having an example retention device at the brake assembly.
Figure 5A:
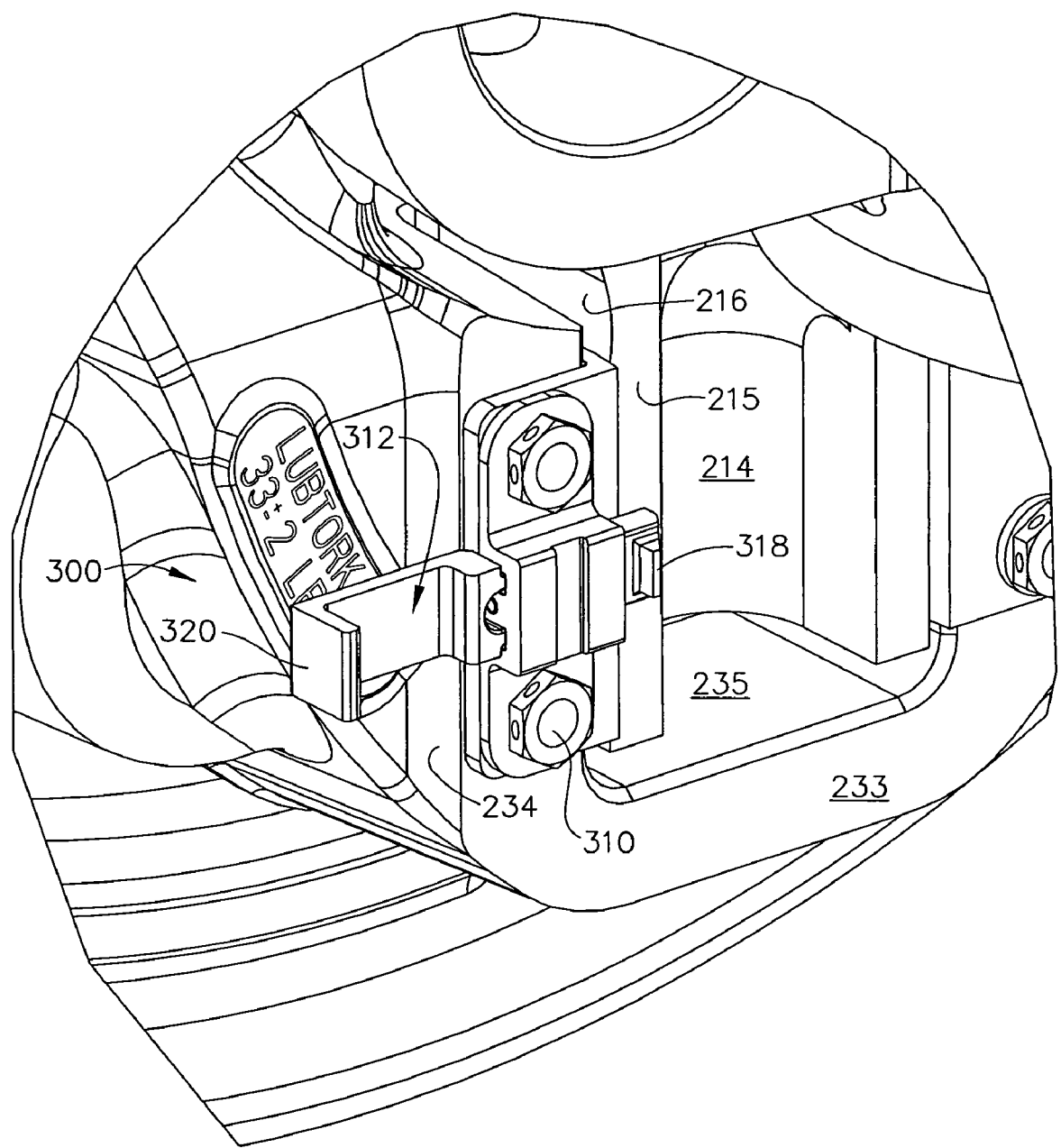
FIG. 5A is an enlarged view of a portion of FIG. 5.

FIG. 5 is a perspective view of an aircraft wheel 200 and a brake assembly 210 having an example retention device 300 at the aircraft brake assembly 210. The brake assembly 210 is mounted on an axle or stationary member 213 of an aircraft landing gear 216. The stationary member 213 includes a stationary member extension 214 having a corner 214A (see FIG. 8), an extension surface 215 (see FIG. 5A), and a side 216. Although the landing gear 216 and the stationary member 213 are extended and retracted from an aircraft (not shown), typically the stationary member 213 remains stationary relative to the brake assembly 210 and, in particular, during a landing of the aircraft. The brake assembly 210 includes a piston housing 230 having a torque take-out extension 233 on which is mounted the example retention device 300 by bolts 310. The torque take-out extension 233 includes a side 234, and a pocket 235 that receives the stationary member extension 214 of the stationary member 213.

Figure 6:
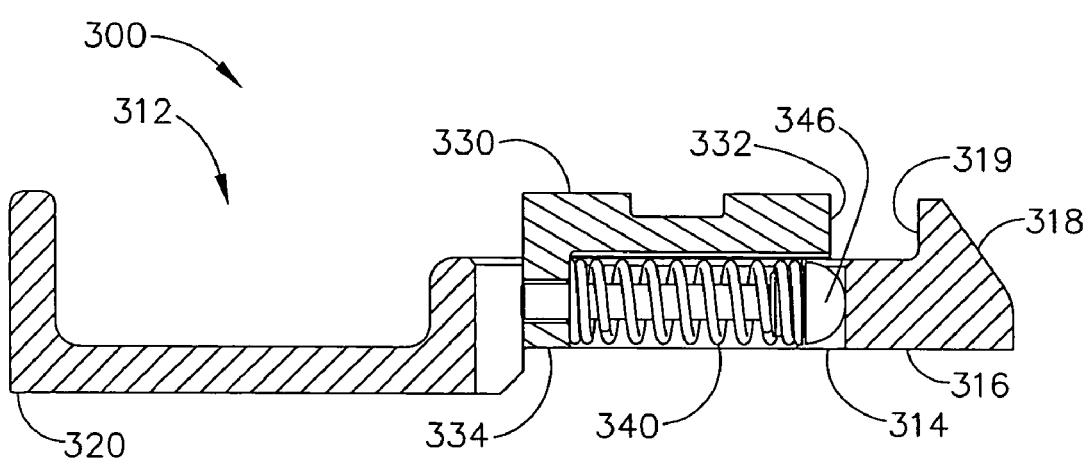
FIG. 6 is cross-sectional view of the example retention device of FIG. 5.
Figure 7:
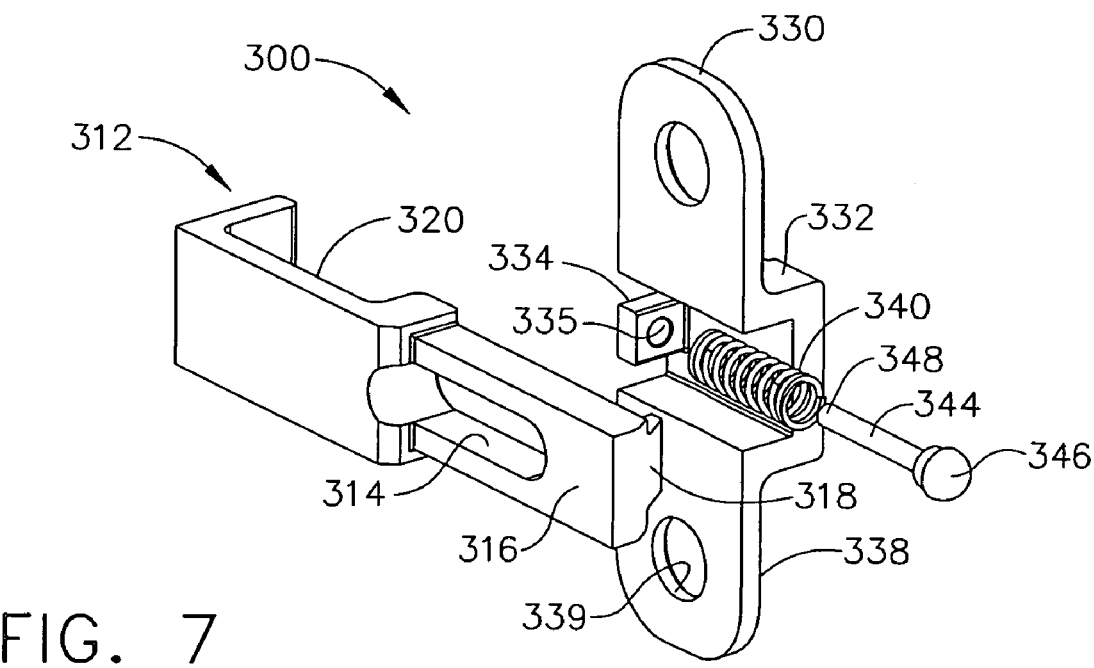
FIG. 7 is an exploded view of the parts of the example retention device of FIG. 5.

As can be seen in FIGS. 5-7, the retention device 300 includes a key member 312 having therein an oval-shaped opening 314, a retention end 316 with a sloped or beveled end member 318 having a back 319, and an end portion or angled end part 320. A bracket 330 includes a stepped portion 332, a bracket tab 334 with a tab opening 335, and a pair of bracket flanges 338 each with a bolt opening 339. A spring or resilient member 340 is positioned upon a resilient member guide 344 having a guide member head 346 and a guide end 348. The guide end 348 is received slidably in the tab opening 335 of the bracket 330 such that the resilient member 340 is captured between the guide member head 346 and the bracket tab 334. As can be readily seen in FIGS. 5-7, the key member 312 is received slidably within the stepped portion 332 whereby the bracket tab 334, guide member 344, and the resilient member 340 are located within the oval-shaped opening 314 (see FIGS. 6 and 7) of the key member 312, and the guide member head 346 abuts an adjacent end of the oval-shaped opening 314. The location of the bracket tab 334, guide member 344, and resilient member 340 within both the stepped portion 332 of the bracket 330 and the oval-shaped opening 314 of the key member 312, accomplishes a compact, low profile example retention device 300 that can be located in an area where little space is available. When the retention device 300 is attached by bolts 310 to the torque take-out extension 233 (see FIG. 5A), the key member 312 is retained or captured between the bracket 330 and the torque take-out extension 233 whereby the key member 312 can slide within the stepped portion 332 of the bracket 330. The sliding movement of the key member 312 is opposed by the bias force of the resilient member 340, and the sliding movement limited by the engagement of the back of the beveled end member 318 with the stepped portion 332 of the bracket 330.

Figure 8:
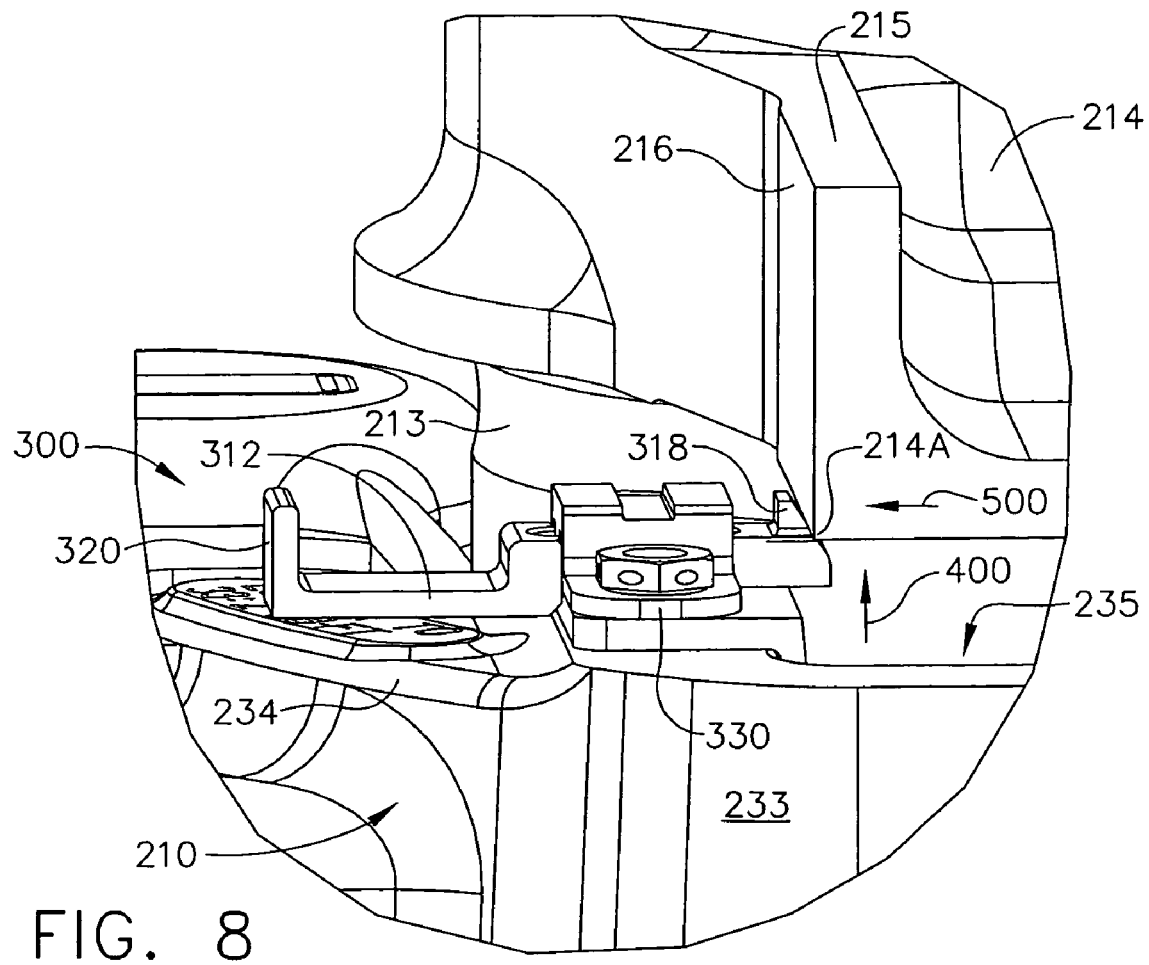
FIG. 8 is a perspective view of the automatic operation of the example retention device of FIG. 6.

The automatic operation of the example retention device 300 is illustrated in FIG. 8. As the brake assembly 210 is mounted upon and moved along the stationary member 213 in the direction of arrow 400, the pocket 235 of the torque take-out extension 233 approaches the stationary member extension 214. The key member 312 of the example retention device 300 is in an at-rest or initial position as illustrated in FIG. 8. As the brake assembly 210 is moved toward an operational position at the stationary member 213 (see FIGS. 5 and 8) and the stationary member extension 214 received in the pocket 235, the beveled end member 318 of the key member 312 engages the corner 214A of the stationary member extension 214 to cause the key member 312 to retract automatically relative to the bracket 330, in the direction of an arrow 500. The key member 312 retracts against the spring force of the resilient member 340, and remains in a retracted position as the stationary member extension 214 is received by the pocket 235, during which the beveled end member 318 engages slidingly the side 216 of the stationary member extension 214. Immediately upon the stationary member extension 214 being received fully within the pocket 235 such that the extension surface 215 moves slightly beyond the beveled end member 318, the key member 312 automatically moves in a direction opposite to the arrow 500 and returns automatically to its initial position, whereby the beveled end member 318 extends over the extension surface 215 (see FIG. 5A). The positioning of the beveled end member 318 over the extension surface 215 retains the brake assembly 210 at the operational position on the stationary member 213. It is contemplated that other engagement techniques such as, for example, a member received in a groove, hole, opening, bracket or receptacle can be utilized to accomplish an engagement between the example retention device 300 and the stationary member extension 214, and that the beveled end member 318 can have any of numerous shapes such as, for example, round, rectangular, square, oblong, or irregular, or combination(s) thereof. Similarly, it is contemplated that the example retention device 300 can be located at the stationary member extension 214 and accomplish an engagement with the torque take-out extension 233 or another part of the brake assembly 210.

The example retention device 300 enables the brake assembly 210 to be released and removed easily from the stationary member 213. Although the retention device 300 is attached to the torque take-out extension 233 at the inboard side of the brake assembly 210, the angled end part 320 of the key member 312 extends slightly beyond the adjacent side 234 of the torque take-out extension 233 (see FIG. 5A) so that the angled end part 320 is partially visible to maintenance personnel. Thus, the angled end part 320 can be easily grasped by maintenance personnel and pulled in the direction of the arrow 500 in FIG. 8, whereby the key member 312 is retracted against the force of the resilient member 340 to move the beveled end member 318 beyond the extension surface 215 and release the brake assembly 210, and then the brake assembly 210 can be easily moved axially along, and off of, the stationary member 213. Even though only partially visible, the operation of the retention device 300 is intuitive to maintenance personnel who are removing the brake assembly 210 from the stationary member 213.

Figure 9:
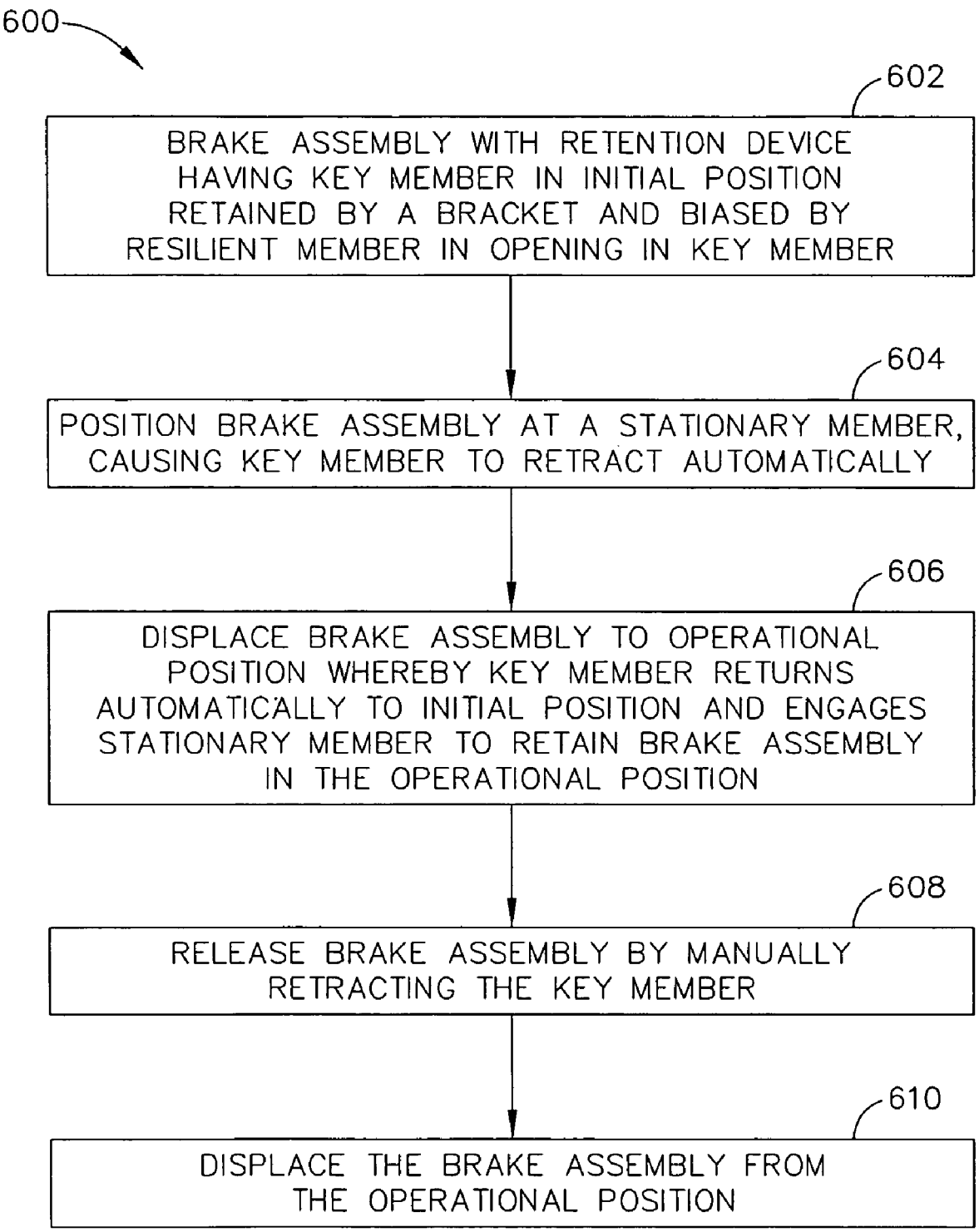
FIG. 9 is a representative flow diagram of an example method for retaining releasably a brake assembly at a stationary member.

FIG. 9 is a representative flow diagram of an example method 600 of releasably retaining a brake assembly at a stationary member and, more particularly, of retaining an aircraft brake assembly upon a landing gear of an aircraft. Initially, the method 600 includes a brake assembly (e.g., the brake assembly 210 in FIG. 5) having a retention device (e.g., the example retention member 300 in FIGS. 5-8) which includes a key member in an initial position (e.g., the key member 312 in FIGS. 5, 5A and 8) retained by a bracket (e.g., the bracket 330 in FIGS. 6 and 7) and biased by a resilient member (e.g., the resilient member 340 in FIGS. 6 and 7) in an opening (e.g., the opening 314 in FIGS. 6 and 7) in the key member, as illustrated by block 602. The brake assembly is then moved to or positioned at (e.g., movement or positioning of the brake assembly in the direction of arrow 400 in FIG. 8) a stationary member (e.g., the stationary member or axle 213 in FIGS. 5 and 8), thereby causing the key member to automatically retract (e.g., the automatic retraction of the key member 312 in the direction of arrow 500 as illustrated in FIG. 8), as illustrated in block 604. The brake assembly is displaced to an operational position at the stationary member (e.g., displacement of the brake assembly 210 along the stationary member 213 in the direction of arrow 400 in FIG. 8), whereby the key member returns automatically to the initial position (e.g., the automatic return, in a direction opposite to arrow 500 in FIG. 8, of the key member 312 to the initial position) and engages the stationary member to retain (e.g., the extension of the beveled end member 318 of the key member 312 over the extension surface 215 in FIG. 5A) the brake assembly in the operational position at the stationary member (block 606). If it is desired that the brake assembly be released from its operation position at or removed from the stationary member, then the brake assembly may be released by manually retracting the key member (e.g., the manual retraction of the key member 312 in the direction of arrow 500 in FIG. 8 so the beveled end member 318 does not extend over the extension surface 215) as illustrated in block 608, and the brake assembly displaced (e.g., moved or displaced in a direction opposite to the arrow 400 in FIG. 8) from its operational position, block 610.

An example method and brake assembly retention device are described with reference to the flowchart illustrated in FIG. 9. However, persons of ordinary skill in the art will readily appreciate that other methods of implementing the example method may alternatively be used. For example, the order of execution of the blocks may be changed, and/or some of the blocks described may be changed, eliminated, or combined.

Figure 1:
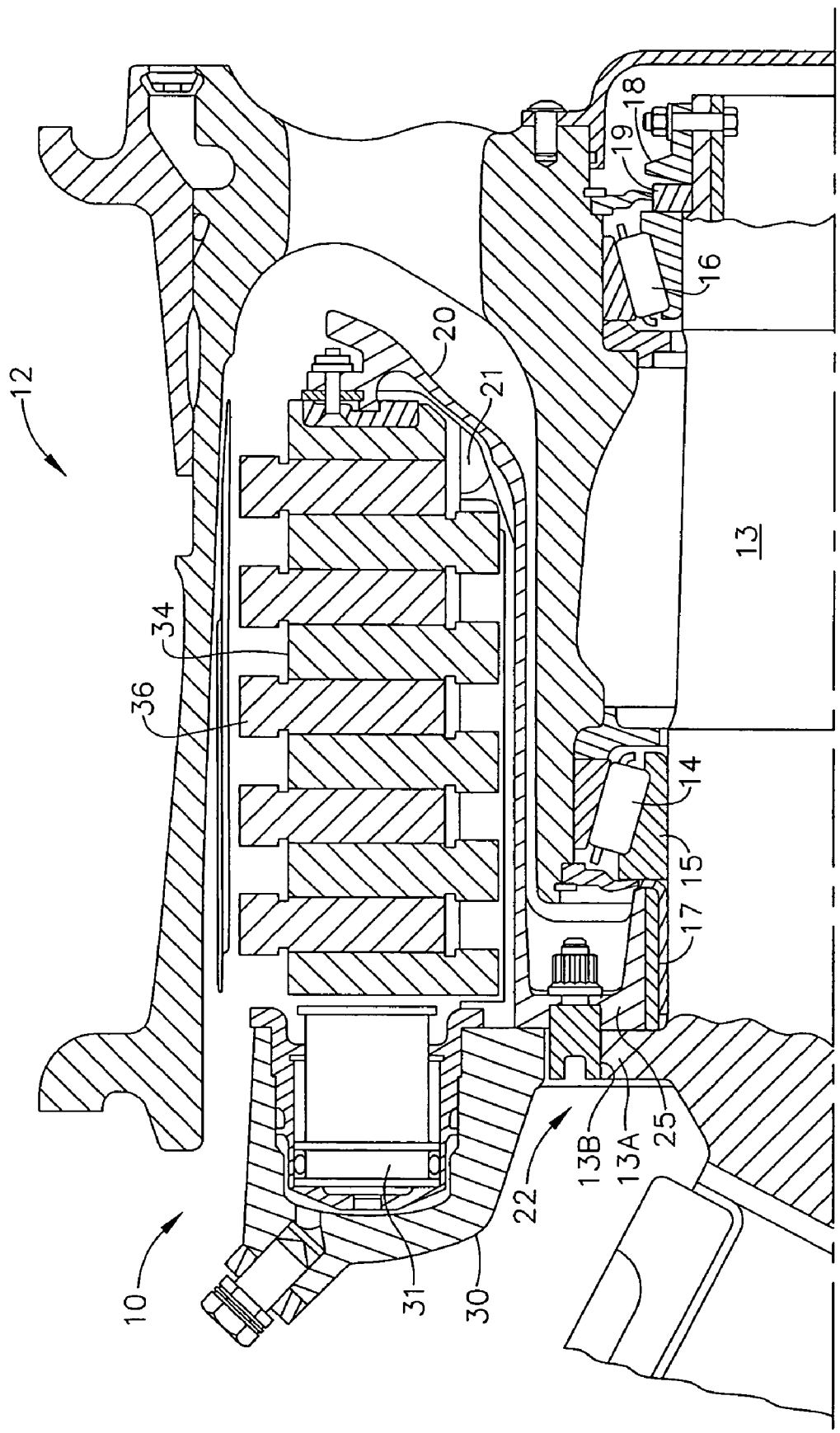
FIG. 1 is a partial cross-sectional illustration of a known aircraft wheel and brake assembly.
Figure 2:
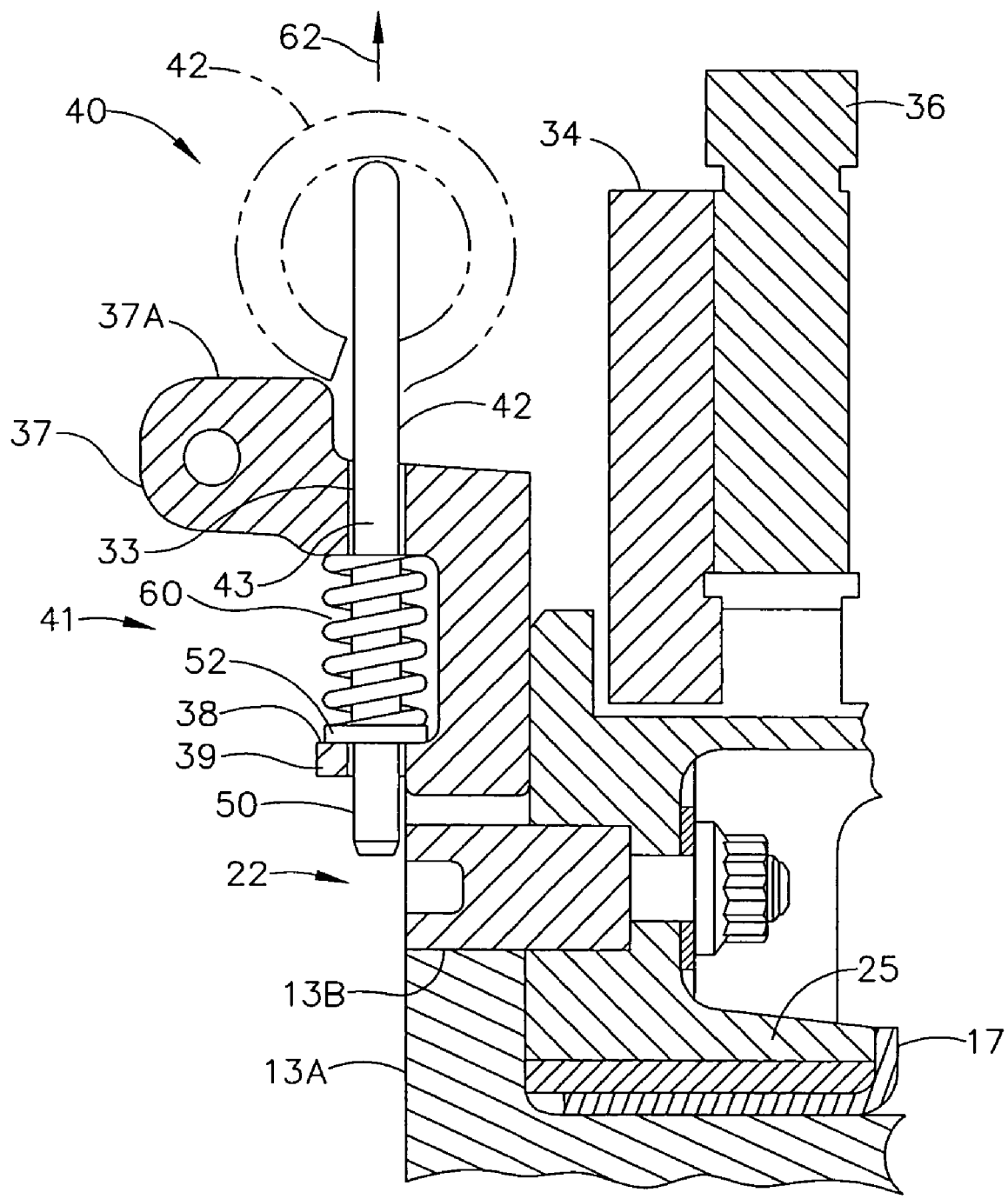
FIG. 2 is a cross-sectional view of a known manually-operated retention mechanism of the brake assembly in FIG. 1.
Figure 3:
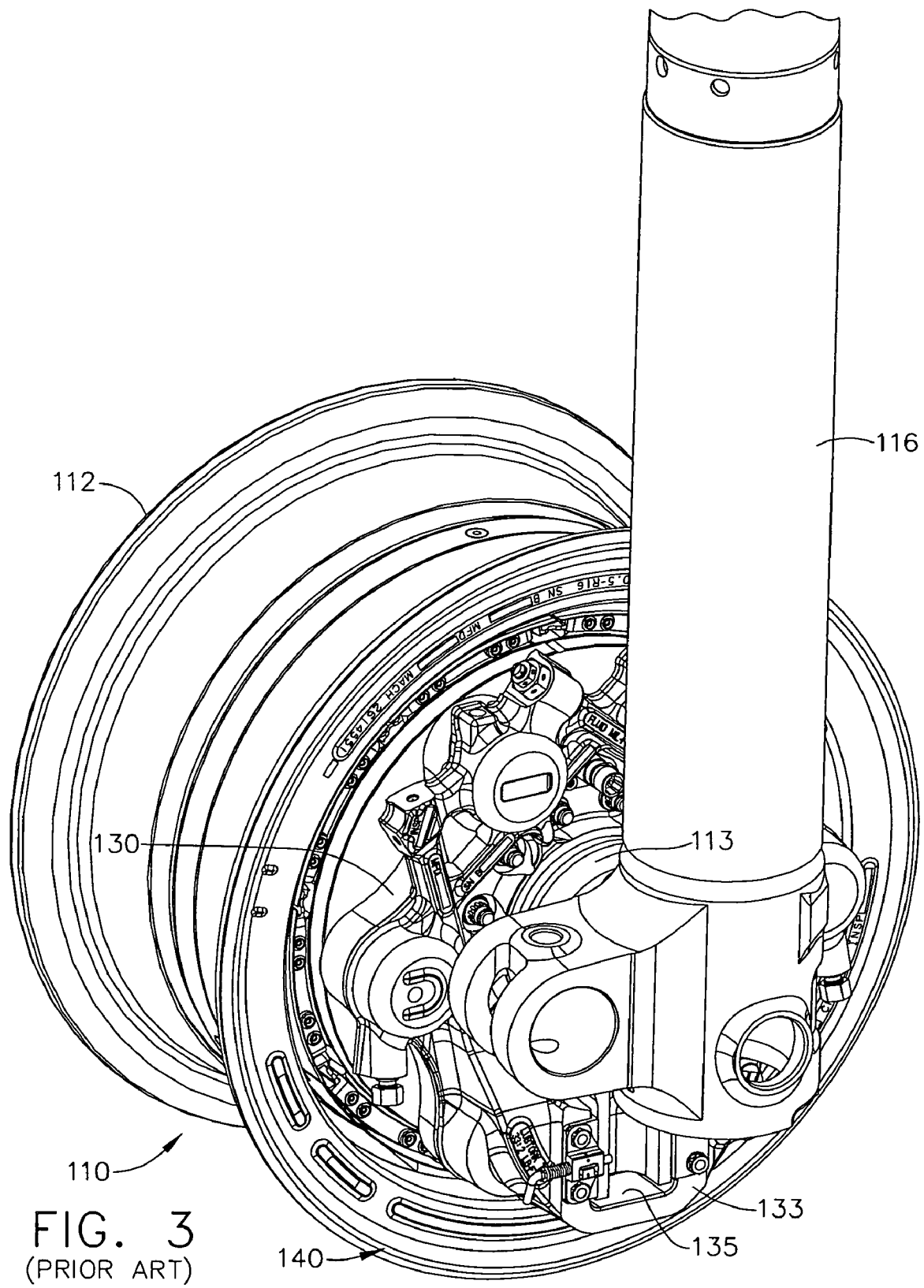
FIG. 3 is a perspective view of another known aircraft wheel and brake assembly having another known manually-operated retention mechanism at the brake assembly.
Figure 3A:
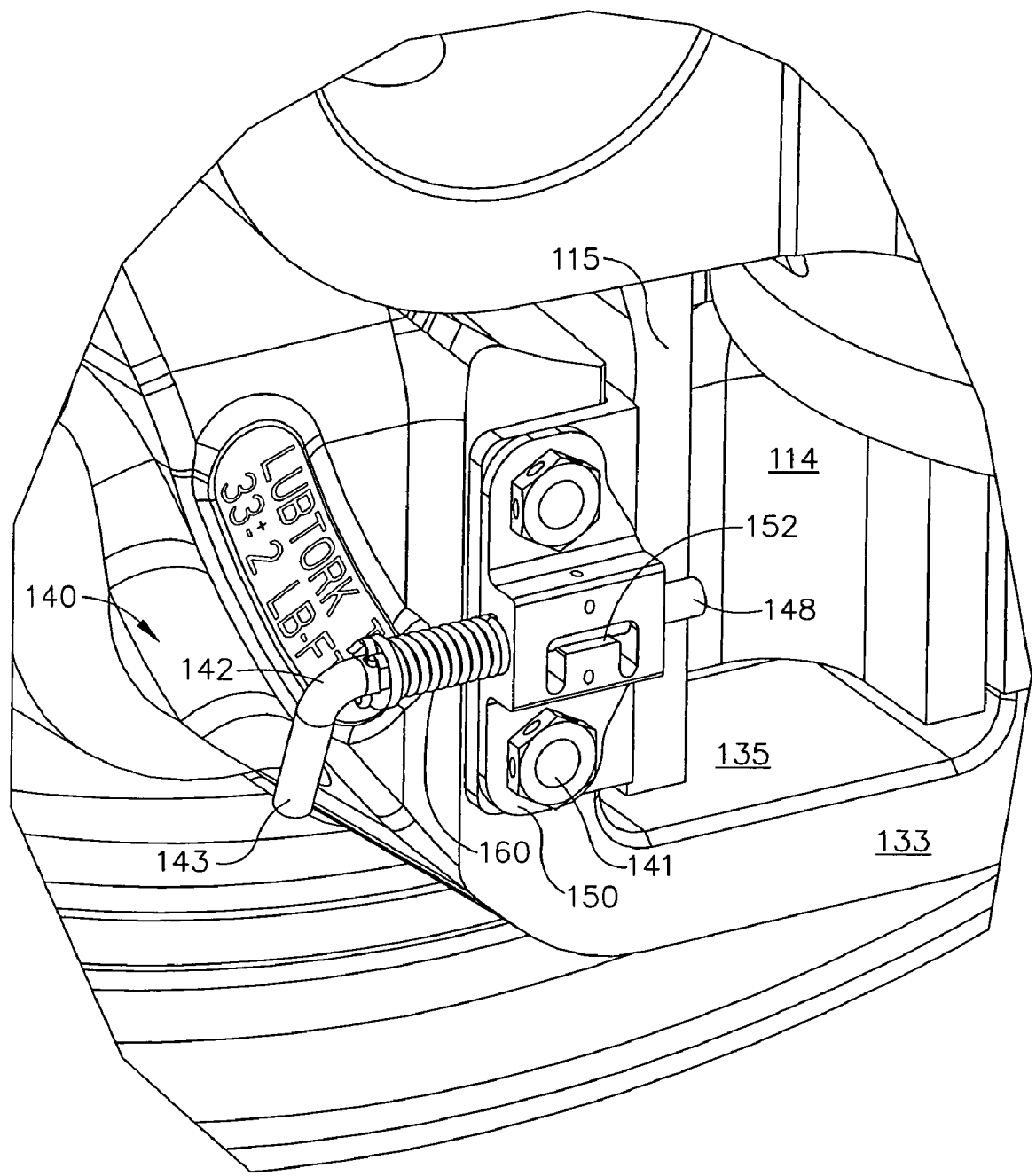
FIG. 3A is an enlarged view of a portion of FIG. 3.
Figure 4:
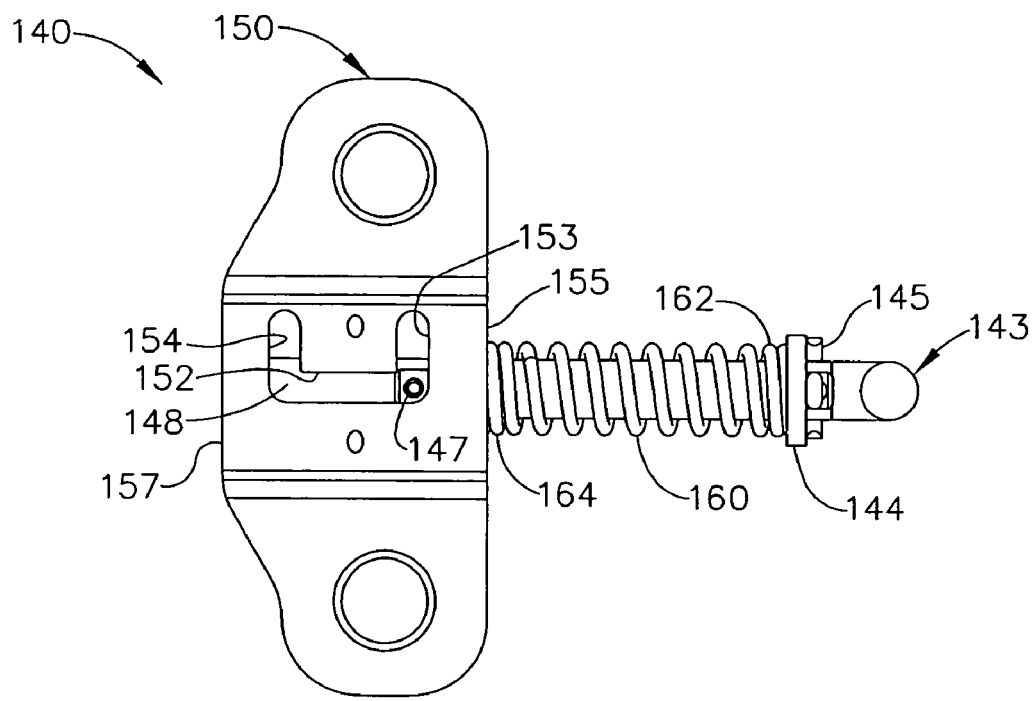
FIG. 4 is a view of the known manually-operated retention mechanism in FIG. 3.

The example method 600 and the example brake retention device 300 disclosed in FIGS. 5 through 9 provide advantages over the prior retention mechanisms such as, for example, the retention mechanism 40 illustrated in FIG. 2 and the retention mechanism 140 illustrated in FIGS. 3, 3A and 4. The example retention device 300 both retracts from and returns automatically to an initial position when the brake assembly 210 is placed upon and moved to an operational position at the stationary member 213. The key member 312 is partially visible to maintenance personnel so it can be easily operated (i.e., grasped and retracted) when it is desired to release or move the brake assembly 210 from its operational position, and the retention device 300 does not have any sharp parts that could snag or damage clothing. The manual retraction of the key member 312 is an intuitive operation for maintenance personnel to perform. Additionally, the key member 312 is biased by the resilient member 340 to an extended position which retains the brake assembly 210 in an operational position at the stationary member 213. This reduces the possibility that foreign objects could engage and displace the key member 312 to a retracted position such that the brake assembly 210 would not be retained in the operational position at the stationary member 213 by the retention device 300 when the wheel 200 is removed from the stationary member 213.

Although a certain example method and article have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A retention device to retain releasably a brake assembly in an operational position at a stationary member, the retention device comprising a bracket which retains a key member, the key member having an opening and biased to an initial position by a resilient member, and the resilient member connected to the bracket and located within the opening in the key member, the retention device positioned at the brake assembly such that moving the brake assembly to the operational position at the stationary member causes the key member to retract and return automatically to the initial position and engage the stationary member to retain the brake assembly at the stationary member.

2. A retention device as claimed in claim 1, wherein the resilient member is positioned about a resilient member guide having one end received by the bracket and another end engaging the key member.

3. A retention device as claimed in claim 2, wherein the one end of the resilient member guide is received slidingly by the bracket.

4. A retention device as claimed in claim 2, wherein the key member includes a portion that enables manual retraction of the key member and the release of the brake assembly.

5. A retention device as claimed in claim 4, wherein the portion includes an angled end part.

6. A retention device as claimed in claim 5, wherein the opening in the key member is oval-shaped and the resilient member guide located within the oval-shaped opening.

7. A retention device as claimed in claim 2, wherein the bracket includes a tab extending into the opening in the key member and slidably receiving the resilient member guide.

8. A retention device as claimed in claim 1, wherein the retention device is positioned at the brake assembly such that engagement of the brake assembly with the stationary member causes the key member to retract automatically and upon reaching the operational position to return automatically to the initial position wherein the key member abuts a surface of the stationary member.

9. A retention device as claimed in claim 8, wherein the key member engages slidingly the stationary member during the automatic retraction of the key member and movement of the brake assembly.

10. A retention device as claimed in claim 1, wherein the brake assembly is an aircraft brake and the stationary member is a landing gear.

11. A method of retaining releasably a brake assembly in an operational position at a stationary member, the brake assembly including a retention device comprising a bracket which retains a key member, the key member having an opening and biased to an initial position by a resilient member, and the resilient member connected to the bracket and located within the opening in the key member, comprising:
   positioning the brake assembly at the stationary member to cause the key member to be automatically retracted; and
   displacing the brake assembly to the operational position whereby the key member returns automatically to the initial position and engages the stationary member to retain the brake assembly in the operational position at the stationary member.

12. Method as claimed in claim 11, further comprising manually retracting the key member so the brake assembly can be released from the operational position.

13. Method as claimed in claim 12, wherein the key member includes an end portion that enables the manual retraction of the key member.

14. Method as claimed in claim 11, further comprising capturing the key member between the bracket and the brake assembly to enable the key member to be biased to and retracted from the initial position.

15. Method as claimed in claim 11, further comprising engaging slidably the key member with the stationary member during the automatic retraction of the key member and displacement of the brake assembly.

16. Method as claimed in claim 11, wherein the brake assembly is an aircraft brake assembly and the stationary member is a landing gear.

17. Method as claimed in claim 11, wherein the resilient member is compressed less at the initial position than during the retraction of the key member.

18. Method as claimed in claim 11, wherein the resilient member is positioned about a resilient member guide having one end received slidably by the bracket and another end engaging the key member.

19. Method as claimed in claim 18, wherein the bracket includes a tab extending into the opening to receive slidably the one end of the resilient member guide.

20. Method as claimed in claim 19, wherein the opening in the key member is oval-shaped and the resilient member guide located within the oval-shaped opening.

* * * * *